United States Patent
Gonzalez Medina et al.

(10) Patent No.: US 10,961,900 B2
(45) Date of Patent: Mar. 30, 2021

(54) COMPRESSOR BYPASS FLOW ARRANGEMENT

(71) Applicant: Cummins Inc., Columbus, IN (US)

(72) Inventors: David Guillermo Gonzalez Medina, Columbus, IN (US); Alan C. Anderson, Columbus, IN (US); Matthew Keith Sease, Columbus, IN (US); David P. Richter, Columbus, IN (US); Rahul Bhardwaj, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/537,821

(22) Filed: Aug. 12, 2019

(65) Prior Publication Data

US 2019/0360390 A1 Nov. 28, 2019

Related U.S. Application Data

(63) Continuation of application No. PCT/US2018/018119, filed on Feb. 14, 2018.
(Continued)

(51) Int. Cl.
*F02B 37/007* (2006.01)
*F02B 37/16* (2006.01)
*F02M 35/02* (2006.01)

(52) U.S. Cl.
CPC .......... *F02B 37/007* (2013.01); *F02B 37/164* (2013.01); *F02M 35/0204* (2013.01); *F02M 2700/126* (2013.01)

(58) Field of Classification Search
CPC ...... F02B 29/04; F02B 37/001; F02B 37/007; F02B 37/16; F02B 37/164; F02B 37/18; F02M 25/06; F02M 2700/126; F02M 35/0204; F02M 35/0215; F02M 35/10157; F02M 35/10183; F02M 35/10216; F02M 35/10222; F02M 35/10255; F02M 35/10268; Y02T 10/144; F05D 2220/40; B60Y 2400/435
See application file for complete search history.

(56) References Cited

U.S. PATENT DOCUMENTS

| 4,222,240 A | 9/1980 | Castellano |
|---|---|---|
| 4,230,437 A | 10/1980 | Bellinger et al. |

(Continued)

FOREIGN PATENT DOCUMENTS

| CN | 102733886 A | 10/2012 |
|---|---|---|
| CN | 105370930 A | 3/2016 |

(Continued)

OTHER PUBLICATIONS

Search Report and Written Opinion, PCT Appln. No. PCT/US18/18119, 11 pgs., dated Apr. 27, 2018.
(Continued)

*Primary Examiner* — Jesse S Bogue
(74) *Attorney, Agent, or Firm* — Taft Stettinius & Hollister LLP

(57) ABSTRACT

Methods and devices are disclosed for introducing a compressor bypass flow that is returned from location that is downstream of a pressure source of an internal combustion engine to an air filter housing that is located upstream of the pressure source.

18 Claims, 2 Drawing Sheets

Related U.S. Application Data

(60) Provisional application No. 62/458,809, filed on Feb. 14, 2017.

(56) References Cited

U.S. PATENT DOCUMENTS

| | | | | |
|---|---|---|---|---|
| 4,328,666 | A | * | 5/1982 | Cummins, Jr. ......... F02C 7/047 60/39.093 |
| 4,817,387 | A | | 4/1989 | Lashbrook |
| 6,666,026 | B2 | * | 12/2003 | Jungsch ................. F01D 15/10 60/39.093 |
| 6,701,710 | B1 | | 3/2004 | Ahrens et al. |
| 6,722,129 | B2 | | 4/2004 | Criddle et al. |
| 7,281,378 | B2 | | 10/2007 | Gu et al. |
| 8,302,402 | B2 | | 11/2012 | Boley et al. |
| 9,638,144 | B2 | * | 5/2017 | Pursifull ................ F02M 25/08 |
| 10,024,251 | B2 | * | 7/2018 | Pursifull ............. F02D 41/0025 |
| 2006/0016187 | A1 | | 1/2006 | Swenson et al. |
| 2007/0039320 | A1 | | 2/2007 | Gu et al. |
| 2012/0198837 | A1 | | 8/2012 | Medina |
| 2013/0118166 | A1 | | 5/2013 | Bjorge et al. |
| 2014/0123621 | A1 | | 5/2014 | Driessens et al. |
| 2015/0219027 | A1 | | 8/2015 | Zur Loye et al. |
| 2015/0300281 | A1 | | 10/2015 | Sivasubramanian et al. |
| 2017/0009679 | A1 | | 1/2017 | Pursifull et al. |

FOREIGN PATENT DOCUMENTS

| | | |
|---|---|---|
| CN | 105569821 A | 5/2016 |
| WO | 2015095137 | 6/2015 |

OTHER PUBLICATIONS

Extended EP Search Report, European Application, No. 18753596.8, dated May 19, 2020, 9 pgs.

Chinese Office Action; The State Intellectual Property Office of the People's Republic of China; Chinese Patent Application No. 201880011688; dated Dec. 28, 2020; 8 pages.

* cited by examiner

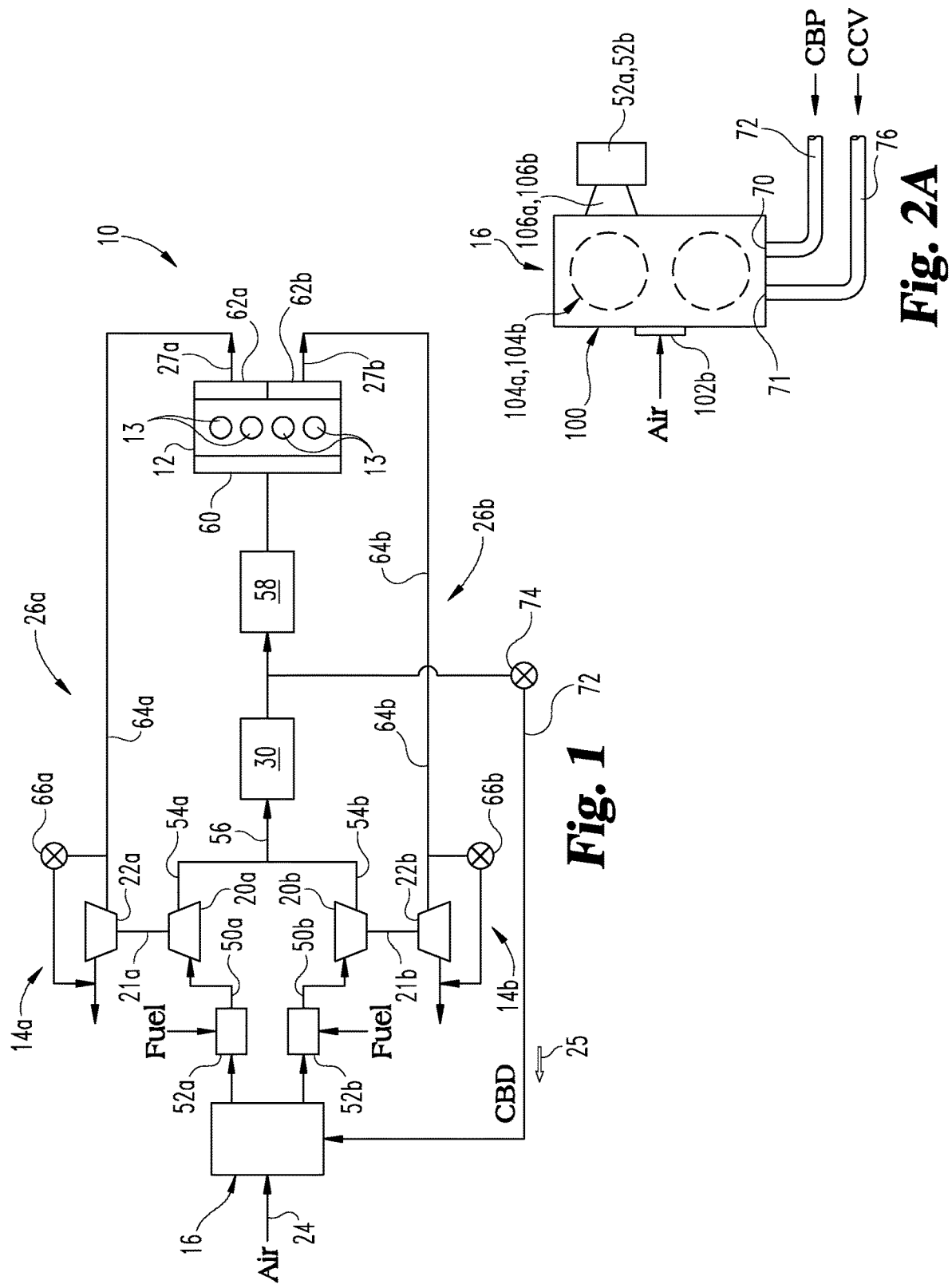

COMPRESSOR BYPASS FLOW ARRANGEMENT

CROSS-REFERENCE TO RELATED APPLICATION

This application is a continuation of PCT Application No. PCT/US18/18119, filed Feb. 14, 2018, which claims priority to U.S. Provisional Application Ser. No. 62/458,809 filed on Feb. 14, 2017, each of which is incorporated herein by reference in its entirety.

FIELD OF THE INVENTION

The present invention relates generally to internal combustion engines, and more particularly to systems, devices and methods for re-introducing a compressor bypass flow into an air filter housing upstream of a turbocharger of the internal combustion engine.

BACKGROUND

Some internal combustion engines include turbochargers with a compressor to compress intake air. Fuel can be added upstream of the compressor for compression and mixing with the intake flow. In addition, some compressors include a bypass in which excess or rejected compressed intake air from the downstream system and fuel (compressor bypass (CBP) flow) are returned from downstream of the compressor to upstream of the compressor. Other systems return high pressure combustion gases that escape between the pistons and cylinders (also known as blow-by or closed crankcase ventilation (CCV) gases) upstream of the compressor to prevent the release of these gases to atmosphere. However, present systems separately return CCV gases and CBP flow directly to the intake piping and/or other locations that may disturb the flow to the turbocharger so that engine performance and transient response are negatively impacted. In addition, introducers for CBP flow can be bulky and expensive to manufacture and implement. Therefore, further improvements in this technology area are needed.

SUMMARY

One embodiment is a unique system, method and/or apparatus for introducing a CBP flow at or upstream of an internal combustion engine and/or upstream of an inlet to a pressure source, such as a compressor of an engine turbocharger. In a specific embodiment, the apparatus includes an air filter housing in the intake system with at least one inlet for receiving the CBP flow, at least one inlet for receiving a fresh airflow, and at least one outlet for providing a mixture of the returned CBP flow and filtered fresh airflow to the pressure source.

In a further embodiment, the air filter housing includes first and second outlets connected to respective ones of first and second turbochargers. Air-fuel mixers are provided between each of the outlets and respective ones of the first and second turbochargers to provide fuel and form charge flows that are provided to the first and second turbochargers for compression. The compressed charge flows are combined and provided to a charge air cooler and then a portion of the cooled, compressed charge flow is returned to the air filter housing through a bypass line connected downstream of the charge air cooler and upstream of an intake throttle.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein:

FIG. 1 is a schematic block diagram of one embodiment of an internal combustion engine and turbocharger system.

FIGS. 2A and 2B are schematic block diagrams of the air filter assembly for the internal combustion engine and turbocharger system of FIG. 1.

DESCRIPTION OF THE ILLUSTRATIVE EMBODIMENTS

Figure 2B:
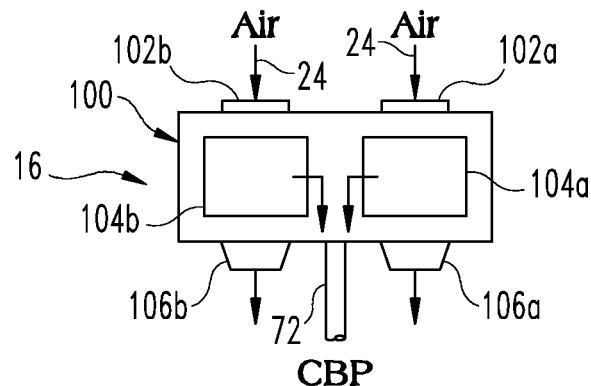

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram of one embodiment of a system 10 with an internal combustion engine 12 and a pressure source such as a first turbocharger 14a and a second turbocharger 14b. Embodiments also contemplate a single turbocharger, or more than two turbochargers. The system 10 includes an air filter assembly 16 to provide a source of filtered intake fresh airflow 24 and a CBP flow 25 to engine 12 through the pressure source, such as through compressors 20a, 20b of turbochargers 14a, 14b. The turbochargers 14a, 14b also each include a turbine 22a, 22b connected to the associated compressor 20a, 20b with a respective shaft 21a, 21b, and also connected to an associated exhaust system 26a, 26b to drive turbine 22a, 22b and thus each compressor 20a, 20b with exhaust flows 27a, 27b.

In the illustrated embodiment, the pressure source includes compressors 20a, 20b of turbochargers 14a, 14b, however, in other embodiments the pressure source can be a positive displacement supercharger, a dynamic compression supercharger, and/or any other device capable of receiving and outputting the charge flow 50a, 50b with increased pressure. It is also contemplated that multiple turbochargers can be included to provide high pressure and low pressure turbocharging stages that compress the intake flow.

Each compressor 20a, 20b receives a corresponding charge flow 50a, 50b from a respective air-fuel mixer 52a, 52b. Each air-fuel mixer 52a, 52b is connected to a fuel source (not shown) to provide fuel for mixing with the combined fresh airflow 24 and CBP flow 25 from air filter assembly 16. The mixture forms a charge flow 50a, 50b including at least fresh airflow 24, CBP flow 25 and fuel. Compressors 20a, 20b each outlet a respective pressurized charge flow 54a, 54b which combine to provide a pressurized charge flow 56 to charge air cooler 30.

Air-fuel mixers 52a, 52b are provided at the inlet or on an upstream side of the respective compressor 20a, 20b. Furthermore, the compressors 20a, 20b can be in flow communication with intercooler or charge air cooler 30. Charge air cooler 30 is located between compressors 20a, 20b and an intake throttle 58.

The engine 12 includes cylinders 13 connected to an intake manifold 60 to receive at least a portion of the charge flow 56 from intake throttle 58. Cylinders 13 are connected to exhaust systems 26a, 26b to release exhaust gases produced by combustion of the charge flow 56 in the cylinders 13. Exhaust systems 26a, 26b may provide exhaust gases to the respective turbochargers 14a, 14b.

In the illustrated embodiment, the engine 12 includes four cylinders 13 in an in-line arrangement. However, the number of cylinders 13 may be any number, and the arrangement of cylinders 13 may be any arrangement, including V-shaped, and is not limited to the number and arrangement shown in FIG. 1. The system 10 can further include an exhaust gas recirculation system (not shown) which recirculates a portion of exhaust flows 27a, 27b that mixes upstream and/or downstream of turbochargers 14a, 14b.

The internal combustion engine 12 can be a diesel engine, a gasoline engine, a dual fuel engine, or any other type of internal combustion engine 12. In certain embodiments, the engine 12 can be a spark-ignited engine that uses a gaseous fuel such as, for example, natural gas, bio-gas, commercially available gas, methane, ethane, propane (LPG), butane, ethanol, producer gas, field gas, nominally treated field gas, well gas, nominally treated well gas, liquefied natural gas (LNG), compressed natural gas, landfill gas, condensate, coal-bed methane (CBM), liquid fuels that are readily vaporized (such as gasoline), and mixtures of these. However, other types of fuels are not precluded, such as any suitable liquid fuel and gaseous fuel. In other embodiments, engine 12 includes a lean combustion engine such as a diesel cycle engine that also uses a liquid fuel such as diesel fuel. Engine 12 can be used in stationary applications, such for power generation applications when coupled with a generator, or for powering equipment such as in mining applications, etc. Other applications are also contemplated and not precluded, such as vehicular applications.

Engine intake manifold 60 distributes the charge flow 56 that is not recirculated as CBP flow 25 to cylinders 13 of engine 12. Exhaust systems 26a, 26b are also coupled to engine 12 with engine exhaust manifold portions 62a, 62b associated with a respective subset of the cylinders 13. Each exhaust system 26a, 26b may include an exhaust conduit 64a, 64b extending from exhaust manifold 62a, 62b to a respective turbine 22a, 22b. Each turbine 22a, 22b may include a valve such as controllable wastegate 66a, 66b or other suitable bypass that is operable to selectively bypass at least a portion of the exhaust flow from the associated turbine 22a, 22b to reduce boost pressure, charge flow and engine torque under certain operating conditions. In another embodiment, turbine 22a, 22b is a variable geometry turbine with a size-controllable inlet opening. While specific examples have been discussed, no particular form of intake or exhaust control valving is required, nor is the use of the same precluded.

An aftertreatment system (not shown) can be connected with an outlet conduit 54 of each of the exhaust systems 26a, 26b or after the exhaust flows are combined (not shown). The aftertreatment system may include, for example, oxidation devices (DOC), particulate removing devices (DPF, CDPF), constituent absorbers or reducers (SCR, AMOX, LNT), reductant systems, and other components if desired.

Referring further to FIGS. 2A-2B, air filter assembly 16 may further include a compressor bypass inlet 70 that is connected to a compressor bypass line 72 that is connected downstream of or at an outlet side of charge air cooler 30 and upstream of intake throttle 58. Compressor bypass line 72 may further include a CBP control valve 74 to control CBP flow 25 to air filter assembly 16. CBP valve 74 can be selectively opened and closed to allow CBP flow 25 to be returned to the air filter assembly 16 to reduce compressor surge under certain operating conditions, such as when an intake throttle 58 is closed. System 10 may further include a crankcase ventilation line 76 connected to engine 12 to return blow-by or crankcase ventilation gases to air filter assembly 16.

Charge air cooler 30 can be located downstream from compressors 20a, 20b and upstream of the location in which compressor bypass 72 is connected to return the CBP flow 25. Charge air cooler 30 may embody, for example, an air-to-air heat exchanger, an air-to-liquid heat exchanger, or a combination of both to facilitate the transfer of thermal energy to or from the charge flow 56 directed to engine 12. The arrangement can differ for a V-shaped engine where each cylinder bank is connected to an inlet supply conduit that includes a turbocharger and/or throttle downstream of a charge air cooler. Multiple throttle valves can also be provided in the inlet supply conduit downstream and/or upstream of the charge air cooler.

Compressors 20a, 20b may be fixed or variable geometry compressors configured to receive charge flows 52a, 52b and compress the flows to a predetermined pressure level before engine 12. The charge flow 52a, 52b is pressurized with the respective compressor 20a, 20b and combined to provide a pressurized, combined charge flow 56 that is sent through charge air cooler 30 and supplied to engine 12 through intake throttle 58 to engine intake manifold 60.

Referring to FIGS. 2A-2B, one embodiment of air filter assembly 16 includes an air filter housing 100 with inlets 102a, 102b for receiving fresh airflow 24. Air filter housing 100 also houses side-by-side air filter arrangements 104a, 104b for receiving the fresh airflow 24 and filtering the fresh air flow to provide the combined fresh airflow 24 and CBP flow 25 to respective ones of first and second outlets 106a, 106b connected to respective ones of the air-fuel mixers 52a, 52b. In one embodiment, each filter arrangement 104a, 104b includes two air filters stacked one upon the other as shown in FIG. 2A.

Each air filter assembly 16 also includes CBP inlet 70 for providing CBP flow 25 to air filter housing 100 from CBP line 72. In one embodiment, the CBP inlet is provided on a different side of the air filter housing 100 than inlets 102a, 102b. In a further embodiment, a CCV inlet 71 is provided to also connect a CCV line 76 to return crankcase ventilation gases from engine 12 to air filter assembly 16. CCV inlet 71 can be on the same side of housing 100 as CBP inlet 70. By returning the CBP flow 25 directly to air filter housing rather than to another location in the intake system plumbing, the CBP flow 25 does not disturb the flow into the compressors 20a, 20b. In addition, the CBP flow 25 is evenly distributed and avoids variations across the turbochargers 14a, 14b.

In certain embodiments, the air filter assembly 16 may include a number of features not shown in FIG. 1, including an air filter(s), noise reduction and flow altering devices, such as, but not limited to, baffles. In another example, a flow meter, such as mass airflow sensor (MAF), can be disposed upstream of the compressor 20, such as at or near a compressor inlet. In addition, one or more sensors that measure temperature, humidity, pressure, pressure change, can be disposed at or near the compressor inlet.

Figure 3:
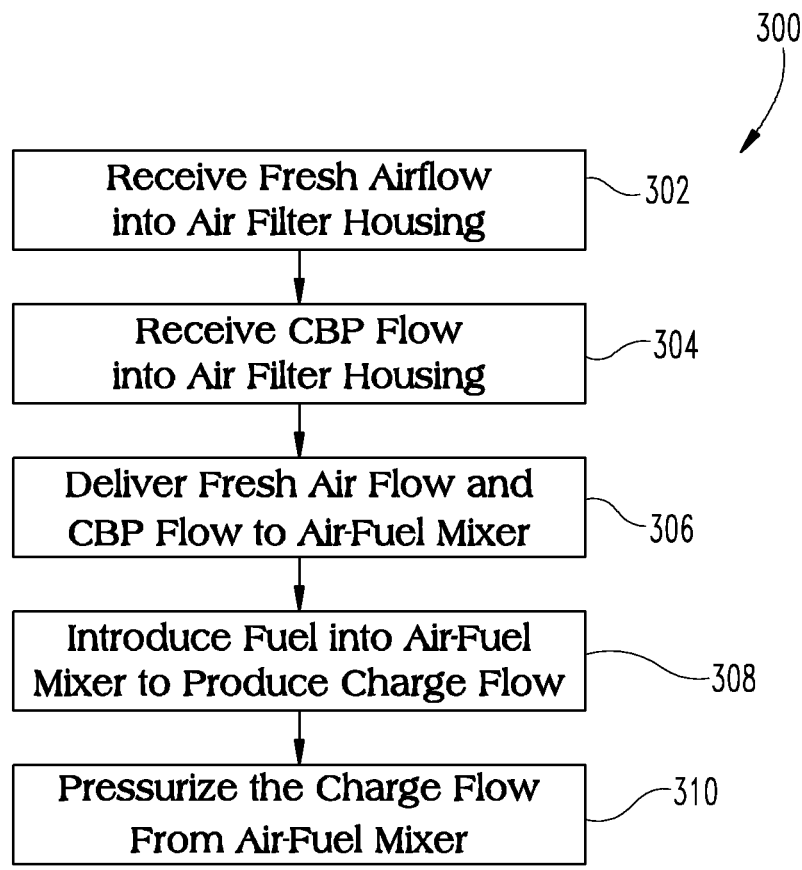
FIG. 3 is a flow diagram of a procedure for returning compressor bypass flow.

Various aspects of the present disclosure are contemplated. One aspect is directed to a procedure for returning a compress bypass flow is shown in FIG. 3. Procedure 300 includes an operation 302 to receive a fresh airflow in a flow passage into an air filter housing upstream of an internal combustion engine. Procedure 300 continues at operation 304 to receive a compressor bypass flow into the air filter housing. From operation 304, procedure 300 continues at operation 306 to deliver the fresh airflow and the compressor bypass flow from the air filter housing to an air-fuel mixer.

Procedure 300 continues at operation 308 to introduce a fuel into the air-fuel mixer to combine with the fresh air flow and the compressor bypass flow to provide a charge flow. From operation 308 procedure 300 continues at operation 310 to pressurize the charge flow downstream of the air-fuel mixer. The compressor bypass flow that is returned at operation 304 is a portion of the pressurized charge flow from operation 310.

In one embodiment, the charge flow is pressurized at operation 310 by a compressor of a turbocharger. In a further embodiment, the pressurized charge flow is cooled by a charge air cooler downstream of the turbocharger and the returned portion of the pressurized charge flow is taken downstream of the charge air cooler and upstream of an intake throttle.

In another embodiment, operation 306 includes delivering the fresh airflow and the compressor bypass flow from the air filter housing to first and second fuel mixers. Operation 308 includes introducing the fuel into each of the first and second fuel mixers to provide first and second charge flows. Operation 310 includes pressurizing the first and second charge flows with respective ones of first and second compressors of first and second turbochargers. In a further embodiment of the procedure, the first and second charge flows from the first and second compressors are combined upstream of a charge air cooler. In yet a further embodiment, a portion of the combined first and second charge flows from a location downstream of the charge air cooler and upstream of an intake throttle to the air filter housing is returned to provide the compressor bypass flow.

According to another aspect, a system includes at least one pressure source including an inlet and an outlet. The at least one pressure source is operable to pressurize a charge flow received by the pressure source through the inlet and to provide the pressurized portion of the charge flow to the outlet. The system includes an air filter housing including at least one air filter housed therein. The air filter housing includes at least one outlet, and the at least one outlet is connected to the inlet of the at least one pressure source. The air filter housing also includes a first inlet for receiving a fresh airflow and a second inlet for receiving a compressor bypass flow that is returned from a location downstream of the at least one pressure source. The fresh airflow and compressor bypass flow combine in the air filter housing and are provided to the at least one pressure source through the at least one outlet.

In one embodiment, the system includes a fuel mixer between the air filter housing and the at least one pressure source, and the fuel mixer is connectable to a fuel source. In a refinement of this embodiment, the system includes a charge air cooler downstream of the pressure source and an intake throttle downstream of the charge air cooler. The second inlet of the air filter housing is connected to a bypass line that extends to an outlet located between the charge air cooler and the intake throttle. In a further refinement, the bypass line includes a control valve to control the compressor bypass flow.

In another embodiment, the at least one outlet of the air filter housing includes a first outlet and a second outlet, and the at least one pressure source includes a first turbocharger and a second turbocharger, and each of the first and second turbochargers is connected to a respective one of the first and second outlets. In a refinement of this embodiment, the system includes a first fuel mixer between the first outlet and the first turbocharger and a second fuel mixer between the second outlet and the second turbocharger. In a further refinement, the system includes a charge air cooler connected to outlets of the first and second turbochargers and an intake throttle downstream of the charge air cooler. In still a further refinement, the second inlet of the air filter housing is connected to a bypass line that extends to an outlet located between the charge air cooler and the intake throttle. In a further refinement, the bypass line includes a control valve to control the compressor bypass flow.

According to yet another aspect, an air filter assembly is provided that includes an air filter housing with at least one air filter housed therein. The air filter housing includes at least one outlet that is connected to an inlet of a pressure source that is operable to pressurize a charge flow to an internal combustion engine. The air filter housing includes a first inlet for receiving a fresh airflow and a second inlet for receiving a compressor bypass flow that is returned from a location downstream of the at least one pressure source. The fresh airflow and compressor bypass flow combine in the air filter housing and are passed through the at least one outlet to the pressure source.

In one embodiment, the at least one outlet of the air filter housing includes a first outlet and a second outlet connectable to respective ones of a first turbocharger and a second turbocharger. In another embodiment, the second inlet of the air filter housing is connected to a bypass line that extends to a location between a charge air cooler and an intake throttle. In yet another embodiment, the air filter housing includes a third inlet connected to a crankcase ventilation line for returning crankcase ventilation gases from an engine to the air filter. In still another embodiment, the at least one air filter includes first and second air filters in side-by-side relation.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
receiving a fresh airflow in a flow passage into an air filter housing upstream of an internal combustion engine;
receiving a compressor bypass flow into the air filter housing;
delivering the fresh airflow and the compressor bypass flow from the air filter housing to a first air-fuel mixer and a second air-fuel mixer;
introducing a fuel into each of the first and second air-fuel mixers to combine with the fresh air flow and the compressor bypass flow to provide a first charge flow and a second charge flow; and pressurizing the first charge flow and the second charge flow downstream of the first air-fuel mixer and the second air-fuel mixer with respective ones of first and second compressors of first and second turbochargers, wherein the compressor bypass flow is a returned portion of the pressurized first and second charge flows.

2. The method of claim 1, wherein receiving the compressor bypass flow in the air filter housing includes receiving the compressor bypass flow through an inlet into the air filter housing that is separate from an inlet of the air filter housing that receives the fresh airflow.

3. The method of claim 1, wherein the charge flow is pressurized by a compressor of a turbocharger.

4. The method of claim 3, wherein the pressurized charge flow is cooled by a charge air cooler downstream of the turbocharger and the returned portion of the pressurized charge flow is taken downstream of the charge air cooler and upstream of an intake throttle.

5. The method of claim 1, further comprising combining the first and second charge flows from the first and second compressors upstream of a charge air cooler.

6. The method of claim 5, further comprising returning a portion of the combined first and second charge flows from a location downstream of the charge air cooler and upstream of an intake throttle to the air filter housing to provide the compressor bypass flow.

7. A system, comprising:
at least one pressure source including an inlet and an outlet, the at least one pressure source operable to pressurize a charge flow received by the pressure source through the inlet and to provide the pressurized portion of the charge flow to the outlet;
an air filter housing including at least one air filter housed therein, the air filter housing including at least one outlet, the at least one outlet connected to the inlet of the at least one pressure source, the air filter housing including:
a first inlet for receiving a fresh airflow; and
a second inlet for receiving a compressor bypass flow that is returned from a location downstream of the at least one pressure source, wherein the fresh airflow and compressor bypass flow combine in the air filter housing and are provided to the at least one pressure source through the at least one outlet; wherein the at least one outlet of the air filter housing includes a first outlet and a second outlet, and the at least one pressure source includes a first turbocharger and a second turbocharger, and each of the first and second turbochargers is connected to a respective one of the first and second outlets.

8. The system of claim 7, further comprising a fuel mixer between the air filter housing and the at least one pressure source, the fuel mixer being connectable to a fuel source.

9. The system of claim 8, further comprising a charge air cooler downstream of the pressure source and an intake throttle downstream of the charge air cooler, wherein the second inlet of the air filter housing is connected to a bypass line that extends to an outlet located between the charge air cooler and the intake throttle.

10. The system of claim 9, wherein the bypass line includes a control valve to control the compressor bypass flow.

11. The system of claim 7, further comprising a first fuel mixer between the first outlet and the first turbocharger and a second fuel mixer between the second outlet and the second turbocharger.

12. The system of claim 11, further comprising a charge air cooler connected to outlets of the first and second turbochargers and an intake throttle downstream of the charge air cooler.

13. The system of claim 12, wherein the second inlet of the air filter housing is connected to a bypass line that extends to an outlet located between the charge air cooler and the intake throttle.

14. The system of claim 13, wherein the bypass line includes a control valve to control the compressor bypass flow.

15. The system of claim 7, wherein the first inlet and the second inlet are provided on different sides of the air filter housing.

16. An air filter assembly, comprising:
an air filter housing including at least one air filter housed therein, the air filter housing including at least one outlet, the at least one outlet connected to an inlet of a pressure source that is operable to pressurize a charge flow to an internal combustion engine, the air filter housing including:
a first inlet for receiving a fresh airflow; and
a second inlet for receiving a compressor bypass flow that is returned from a location downstream of the at least one pressure source, wherein the fresh airflow and compressor bypass flow combine in the air filter housing and are passed through the at least one outlet to the pressure source, wherein the at least one outlet of the air filter housing includes a first outlet and a second outlet connectable to respective ones of a first fuel mixer connectable to a first turbocharger and a second fuel mixer connectable to a second turbocharger, and the second inlet of the air filter housing is connected to a bypass line that extends to a location between a charge air cooler that receives compressed charge flow from the first and second turbochargers and an intake throttle.

17. The assembly of claim 16 wherein the air filter housing includes a third inlet connected to a crankcase ventilation line for returning crankcase ventilation gases from an engine to the air filter.

18. The assembly of claim 16, wherein the at least one air filter includes first and second air filters in side-by-side relation.

* * * * *